United States Patent
Fioravanti et al.

(10) Patent No.: US 8,307,279 B1
(45) Date of Patent: Nov. 6, 2012

(54) SMOOTH ZOOMING IN WEB APPLICATIONS

(75) Inventors: Ryan James Fioravanti, Kitchener (CA); Cedomir Segulja, Toronto (CA)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/245,421

(22) Filed: Sep. 26, 2011

(51) Int. Cl.
*G06F 17/00* (2006.01)

(52) U.S. Cl. ........ 715/243; 715/235; 715/252; 715/253; 715/800; 715/838

(58) Field of Classification Search .................. 715/252, 715/253, 788, 798, 800, 243, 235, 815, 838
See application file for complete search history.

(56) References Cited

U.S. PATENT DOCUMENTS

| | | | |
|---|---|---|---|
| 5,682,487 A | 10/1997 | Thomson | |
| 5,854,624 A | 12/1998 | Grant | |
| 5,990,930 A | 11/1999 | Shibata | |
| 6,066,829 A | 5/2000 | Ishikawa | |
| 6,211,856 B1 | 4/2001 | Choi et al. | |
| 6,456,305 B1 * | 9/2002 | Qureshi et al. | 715/800 |
| 6,466,203 B2 | 10/2002 | Van Ee | |
| 6,549,217 B1 | 4/2003 | De Greef et al. | |
| 7,019,731 B2 | 3/2006 | Nishiyama | |
| 7,075,512 B1 | 7/2006 | Fabre et al. | |
| 7,107,525 B2 | 9/2006 | Purvis | |
| 7,219,309 B2 | 5/2007 | Kaasila et al. | |
| 7,222,306 B2 | 5/2007 | Kaasila et al. | |
| 7,287,220 B2 | 10/2007 | Kaasila et al. | |
| 7,487,447 B1 * | 2/2009 | Jerger | 715/252 |
| 7,516,402 B2 * | 4/2009 | Koivisto et al. | 715/238 |
| 7,568,166 B2 | 7/2009 | Kato | |
| 7,712,018 B2 * | 5/2010 | Brown et al. | 715/204 |
| 7,716,568 B2 * | 5/2010 | Ido et al. | 715/204 |
| 7,861,165 B2 * | 12/2010 | Stevenson | 715/273 |
| 7,973,807 B2 * | 7/2011 | Mielke | 345/642 |
| 2002/0021308 A1 | 2/2002 | White et al. | |
| 2002/0091738 A1 * | 7/2002 | Rohrabaugh et al. | 707/517 |

(Continued)

OTHER PUBLICATIONS www.456bereastreet.com/archive/201101/ios_browsers_that_allow_font_scaling_and_text_reflow/, iOS Browsers That Allow Font Scaling and Text Reflow, web page, Sep. 16, 2011.

(Continued)

*Primary Examiner* — Stephen Hong
*Assistant Examiner* — Matthew Ludwig
(74) *Attorney, Agent, or Firm* — Young Basile Hanlon MacFarlane P.C.

(57) ABSTRACT

A system for smooth zooming in web applications includes a structured document defining a plurality of display elements including a scalable element defined to be located at least partially within a resizable container element when rendered; a rendering component operable to receive the structured document as an input, execute a rendering function that calculates a display position for each of the plurality of display elements, and define rendered content based at least in part on the display position for each of the plurality of display elements; a display component operable to output a viewable area of the rendered content; and a scaling component operable to receive a scaling input, redefine the scalable element based at least in part on the scaling input, and selectively redefine the resizable container element based at least in part on the display position of the resizable container element with respect to the viewable area of the rendered content.

30 Claims, 6 Drawing Sheets

U.S. PATENT DOCUMENTS

| | | |
|---|---|---|
| 2002/0103697 A1* | 8/2002 | Lockhart et al. ............... 705/14 |
| 2003/0040341 A1 | 2/2003 | Casais |
| 2003/0182628 A1 | 9/2003 | Lira |
| 2003/0229845 A1* | 12/2003 | Salesin et al. ............... 715/500 |
| 2004/0044966 A1 | 3/2004 | Malone |
| 2004/0145593 A1* | 7/2004 | Berkner et al. ............... 345/619 |
| 2005/0060648 A1 | 3/2005 | Fennelly et al. |
| 2005/0066286 A1 | 3/2005 | Makela |
| 2005/0071364 A1 | 3/2005 | Xie et al. |
| 2005/0149878 A1 | 7/2005 | White et al. |
| 2005/0268243 A1 | 12/2005 | Moser |
| 2006/0041340 A1 | 2/2006 | Stefani |
| 2006/0103667 A1 | 5/2006 | Amit et al. |
| 2006/0197782 A1 | 9/2006 | Sellers et al. |
| 2006/0227153 A1 | 10/2006 | Anwar et al. |
| 2007/0213948 A1 | 9/2007 | Hornsetein |
| 2007/0216687 A1 | 9/2007 | Kaasila et al. |
| 2007/0288855 A1 | 12/2007 | Rohrabaugh et al. |
| 2007/0298773 A1 | 12/2007 | Uematsu et al. |
| 2008/0141120 A1 | 6/2008 | White et al. |
| 2008/0148146 A1 | 6/2008 | Estrada et al. |
| 2009/0089704 A1 | 4/2009 | Makela |
| 2009/0109243 A1 | 4/2009 | Kraft et al. |
| 2011/0047505 A1* | 2/2011 | Fillion et al. ............... 715/788 |

OTHER PUBLICATIONS

Fogaras et al., Scaling Link-Based Similarity Search, ACM May 10-14, 2005, pp. 641-650.

Yang et al., Internet Browsing: Visualizing Category Map by Fisheye and Fractal Views, IEEE 2002, pp. 1-6.

Ramos et al., Zliding: Fluid Zooming and Sliding for High Precision Parameter Manipulation, ACM 2005, pp. 143-152.

* cited by examiner

SMOOTH ZOOMING IN WEB APPLICATIONS

TECHNICAL FIELD

The present invention relates in general to a graphical user interface and in particular to smooth zooming of display elements in web applications.

BACKGROUND

The Internet is a global system of interconnected computer networks. The Internet carries various information resources and services, including the World Wide Web (WWW). The WWW is a client-server model that includes web servers that provide access to documents via Hypertext Transfer Protocol (HTTP). Documents on the web servers are identified using Uniform Resource Locators (URLs). The documents and other content provided by web servers can be accessed by clients by way of a web browser application.

The documents and other content can include web pages or web applications created using Hyper Text Markup Language (HTML) or other markup languages. Some web browsers are capable of rendering web pages or web applications in a certain way using one or more Cascading Style Sheets (CSS) referenced by the web pages or web applications.

Web browsers commonly implement a global zoom function. This function affects all of the elements on a web page simultaneously and proportionally, for example, by scaling all of the text and images on a web page by a scaling factor. One way of implementing this is to provide a menu button or command that allows the user to select a global scaling factor. Another way of implementing this, on touch screen devices, is by scaling the web page according to the relative motion of two touch points. Because the screen size of the many touch screen devices, such as mobile phones or tablet computers, is limited, global zoom functions are commonly used.

SUMMARY

Disclosed herein are embodiments of systems and methods for smooth zooming in web applications.

One aspect of the disclosed embodiments is a system for smooth zooming in web applications. The system includes a structured document defining a plurality of display elements, the plurality of display elements including a resizable container element and a scalable element defined to be located at least partially within the resizable container element when rendered; a rendering component operable to receive the structured document as an input, execute a rendering function that calculates a display position for each of the plurality of display elements, and define rendered content based at least in part on the display position for each of the plurality of display elements; a display component operable to output a viewable area of the rendered content; and a scaling component operable to receive a scaling input, redefine the scalable element based at least in part on the scaling input, and selectively redefine the resizable container element based at least in part on the display position of the resizable container element with respect to the viewable area of the rendered content.

Another aspect of the disclosed embodiments is a system for smooth zooming in web applications that includes a structured document defining a plurality of display elements, the plurality of display elements including a resizable container element having a container size attribute and a scalable element having a scaling attribute, wherein the scalable element is defined to be located at least partially within the resizable container element when rendered; a rendering component operable to receive the structured document as an input, execute a rendering function that calculates a display position for each of the plurality of display elements, and define rendered content based at least in part on the display position for each of the plurality of display elements; a display component operable to output a viewable area of the rendered content; and a scaling component operable to receive a scaling input requesting scaling of the scalable element, redefine the scaling attribute of the scalable element based at least in part on the scaling input, calculate an updated container size attribute for the resizable container element, and set the container size attribute to the updated container size attribute if the resizable container element is at least partially positioned within the viewable area of the rendered content at the updated container size.

Another aspect of the disclosed embodiments is a method for smooth zooming in web applications that includes receiving a structured document defining a plurality of display elements, the plurality of display elements including a resizable container element and a scalable element defined to be located at least partially within the resizable container element; executing a rendering function that calculates a display position for each of the plurality of display elements; producing rendered content, the rendered content based at least in part on the display position for each of the plurality of display elements; receiving a scaling input; redefining the size of the scalable element according to the scaling input; and selectively redefining the size of the resizable container element based on the display position of the resizable container element with respect to the viewable area of the rendered content.

BRIEF DESCRIPTION OF THE DRAWINGS

The description herein makes reference to the accompanying drawings wherein like reference numerals refer to like parts throughout the several views, and wherein.

DETAILED DESCRIPTION

Some web browsers, such as mobile web browsers executing on mobile devices (e.g., a smartphone), provide a global zoom function, but do not provide a zoom function that operates on a single on-screen element (such as a picture). Resizing one or more elements of a web page (e.g., using JavaScript functions) can cause the browser to execute a rendering function, where the web browser recalculates the positions and geometries of the elements displayed within the web page to account for the updated size and/or position of the one or more resized elements. This is sometimes referred to as a "browser reflow." On some computing devices, excessive browser reflows can lead to unacceptable performance (e.g., a slower/less-smooth zooming process). The systems and methods described herein avoid unnecessary browser reflows by selectively resizing the container element(s) in which the element being scaled is located.

Figure 1:
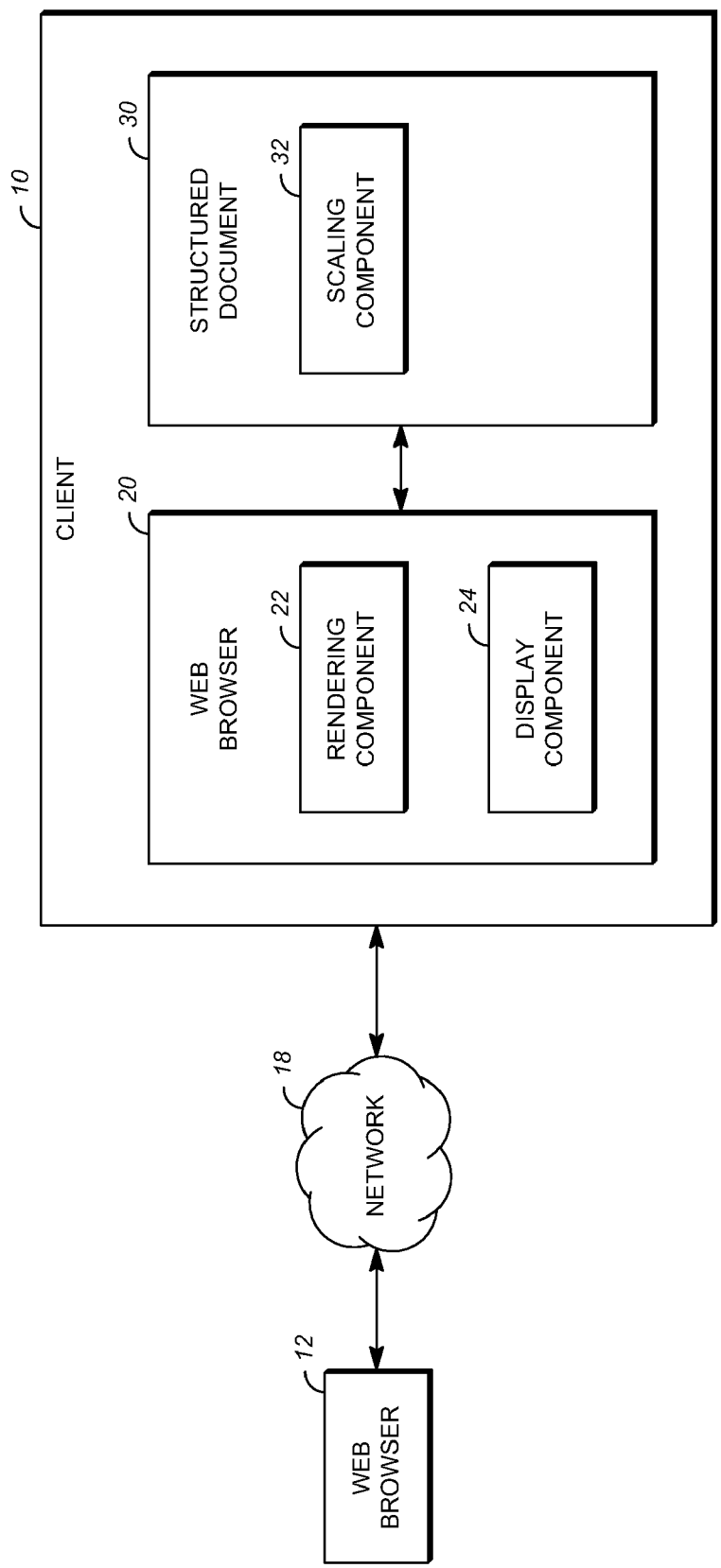
FIG. 1 is block diagram showing an exemplary environment for operation of a system for smooth zooming in web applications.

FIG. 1 is a diagram showing smooth zooming in web applications implemented in an exemplary environment. As shown in FIG. 1, a client 10 and a web server 12 are in communication via a network 18. Each of the client 10 and the web server 12 may be a single system or multiple systems. These systems can be computing devices executing software operable to perform the functionality described herein with respect to the client 10 and the web server 12. The network 18 can allow communication between the client 10 and the web server 12 in any suitable manner.

As shown in FIG. 1, the client 10 can include a client application, which in one example is a web browser 20. The web browser 20 can be operable to request objects, including documents, images, data files, or any other kind of data computer-readable form, from the web server 12. For example, the client 10 can send a request to the web server 12 in the form of a URL, and web server 12 can transmit to the client 10 a web page (i.e., HTML and/or additional code defining a web page) associated with that URL, along with any content associated with the web page, in response to the request. The web browser 20 may include a rendering component 22 and a display component 24, which will be explained herein. In other examples, the client application need not be a web browser, but can be any application including a rendering component 22 and a display component 24.

In some embodiments, the client 10 can be operable to receive, assemble, interpret and/or execute, and render a structured document 30. The structured document 30 can be transmitted to the client 10 by the web server 12 via the network 18. The structured document 30 can describe, for example, a plurality of display elements that, when rendered by the web browser 20, form the visible portions of a web page (as well as non-visible portions of a web page that define layout or formatting). The structured document 30 can be a HyperText Markup Language (HTML) document that complies with the Document Object Model (DOM) specification. The structured document 30 can be assembled from multiple documents, such as by using HTML iframes. Other languages and technologies can be utilized by or form part of the structured document 30, such as Extensible Markup Language (XML), Extensible HyperText Markup Language (XHTML), Cascading Style Sheets (CSS), Java, JavaScript, and the like.

The structured document 30 can include a scaling component 32 in the form of executable code elements that are adapted to be interpreted and executed by the web browser 20. The scaling component 32 can be provided in the form of JavaScript functions and CSS. The scaling component 32 can be operable to modify the appearance of portions of a web page defined by the structured document 30, based on a scaling input that requests scaling of a portion of the structured document 30.

Figure 2:
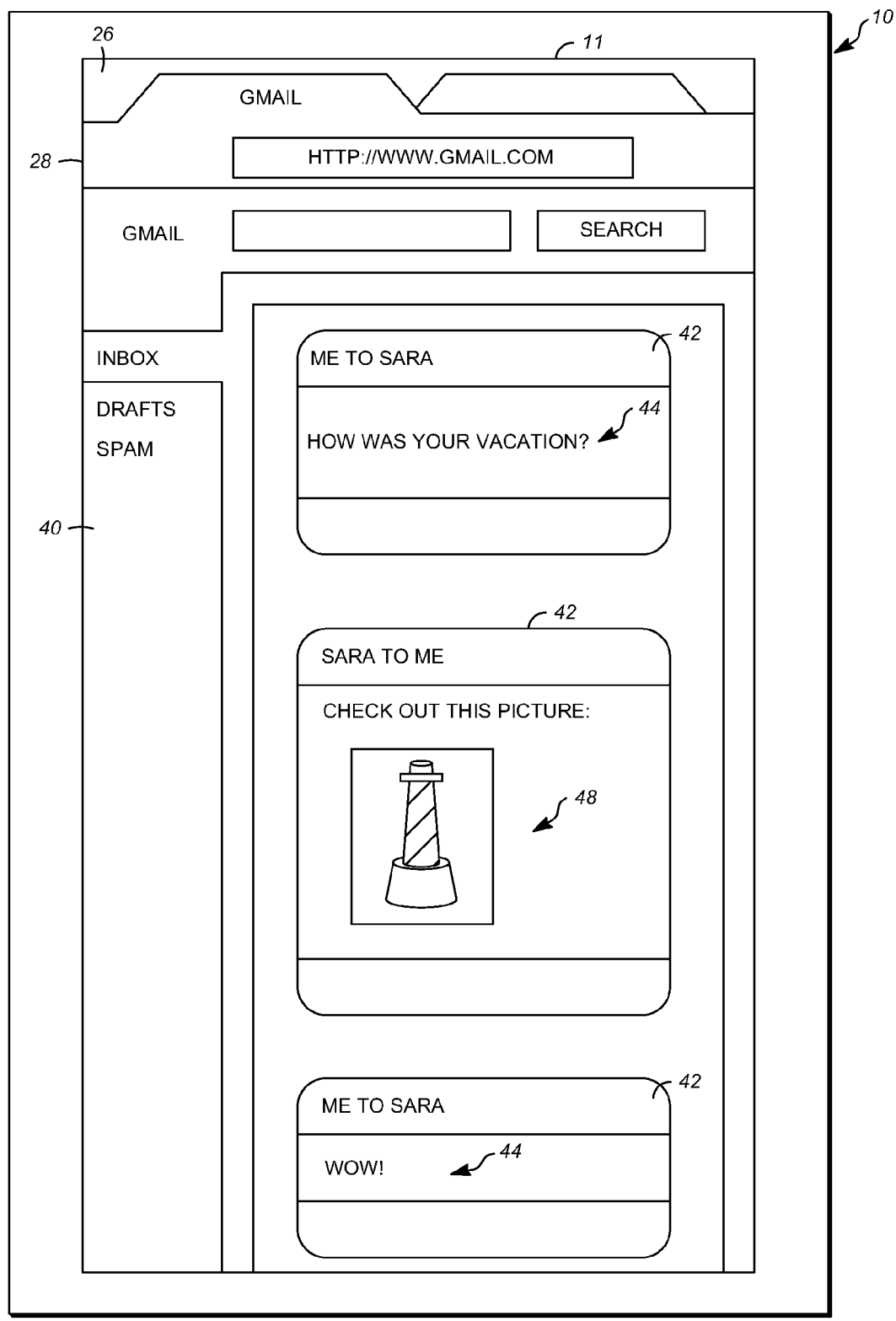
FIG. 2 is an illustration showing rendered content within a web browser that is displayed on the display screen of a client device.

As shown in FIG. 2, the client 10 can be in the form of a computing device, such as a mobile phone, a tablet computer, a laptop computer, a notebook computer, and the like. The client 10 can include a display screen 11. The display screen 11 can be a touch-sensitive display screen that is operable to display images in response to a video signal and is also operable to output a touch signal that indicates a position that is touched by a user. Examples of technologies that can be employed to output the touch signal include resistive touch sensing, surface acoustic wave touch sensing, and capacitive touch sensing. Other input devices can be used in lieu of a touch sensitive display screen, such as a keyboard or a mouse.

In some embodiments, a user interface 26 of the web browser 20 and a content display area 28 of the web browser 20 can be displayed on the display screen 11. The user interface 26 can be omitted, or at times, not be visible on the display screen 11. The content display area 28 can occupy some or all of the display screen 11.

The structured document 30 can be accepted by the rendering component 22 of the web browser 20 as an input, and the rendering component 22 produces rendered content 40 as an output. The rendered content 40 is the content that is displayed by the web browser 20 or other application when the structured document 30 is rendered. At least a portion of the rendered content 40 can be displayed on the display screen 11.

The rendering component 22 defines the rendered content 40 by executing a rendering function. As previously noted, the structured document 30 describes a plurality of display elements. The rendering function calculates a display position for each of the plurality of display elements. Based of the display positions that are calculated by the rendering function, the rendering component 22 produces the rendered content 40. In the rendered content 40, each of the plurality of display elements is located at its respective display position. One example of a rendering function is the function by which conventional web browsers perform a "browser reflow."

The web browser 20 can support functions that allow the user to change the view of the rendered content 40 with respect to the content display area 28 on a global basis. These functions can include pan and zoom functions that move or zoom the entirety of the rendered content 40. As a result, less than the entire rendered content 40 may be viewable at once. In some embodiments, the display component 24 accepts the rendered content 40 the global pan and view states of the web browser 20, and the size of the content display areas as input. Based on these inputs, the display component 24 calculates a viewable area of the rendered area of the rendered content 40, and outputs the viewable area of the rendered content to the content display area 28, coextensive with the content display area 28.

The example of the rendered content 40 that is shown in FIG. 2 is a web-based email program that displays multiple messages of a single conversation at one, each enclosed within its own container element 42. The body of each message can include one or more content elements 44. The container elements 42 and the content elements 44 can each be a single element or a collection of elements. As an example, HTML <div> elements can be used as the container elements 42. As an example, the content elements 44 can be one or more text characters, raster images, vector images, video, or other elements.

The rendered content 40 can also include one or more resizable container elements 46 that each contains one or more scalable elements 48. The resizable container elements 46 can be equivalent to the container elements 42, but can be resized by the scaling component 32. As an example, this can be implemented by causing the scaling component 32 to modify a container size attribute, such as the height and/or width attributes of all of part of the resizable container elements 46, either using HTML attributes or CSS properties. The scalable elements 48 are equivalent to the content elements 44, but can be resized by the scaling component 32. This can be implemented by causing the scaling component 32 to modify a scaling attribute, such as the height and/or width of the scalable elements 48, using the scaled CSS property.

The scaling component 32 can be operable to receive the scaling input requesting scaling of the scalable element 48. The scaling component 32 can redefine the scalable element 48 based on the scaling input. As one example, the scaling component 32 can modify the scaling attribute of the scalable element 48 according to the scaling input, in a manner that does not change the positions of other elements of the rendered content. In some embodiments, the scaling component 32 redefines the resizable container element by calculating an updated container size attribute for the resizable container element 46, and setting the current container size attribute to the updated container size attribute if the resizable container element 46 will be at least partially positioned within the viewable area of the rendered content 40 at the updated container size when rendered. As an example, this determination can be implemented using JavaScript functions that are incorporated in the structured document as part of the scaling component 32, and which are able to access information from the web browser, such as the size of the rendered content 40, the size and position of the viewable area of the rendered content 40, and the positions of the display elements that are represented in the rendered content 40.

The container elements 42, the content elements 44, the resizable container elements 46, and the scalable elements 48 are all examples of the display elements that can be defined by the structured document 30. Definitions of any number of the container elements 42, the content elements 44, the resizable container elements 46, and the scalable elements 48 can be provided in the structured document 30. The container elements 42 and the content elements 44 can optionally be resizable and scalable in the same manner as described with respect to the resizable container elements 46 and the scalable elements 48, but are not described as such herein for the sake of clarity.

While the description above and FIG. 2 use a web-based email system as an example, the container elements 42, the content elements 44, the resizable container elements 46, and the scalable elements 48 can be implemented in other contexts. As an example, in an image gallery application (such as a web-based image gallery application), the container elements 42 and the resizable container element 46 could be cells in a table (visible or invisible) and the content elements 44 and the scalable element 48 could be images.

Operation of an example of the scaling component 32 will now be explained with reference to FIGS. 3A-3C.

Figure 3B:
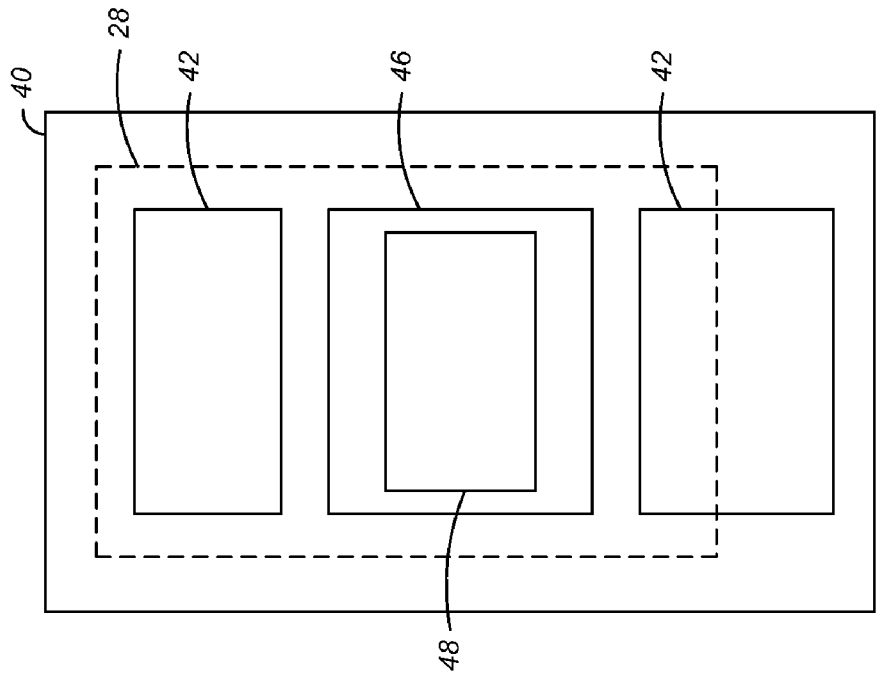
FIGS. 3A-3C are illustrations showing resizing and scaling of a resizable container element and a scalable element.
Figure 3A:
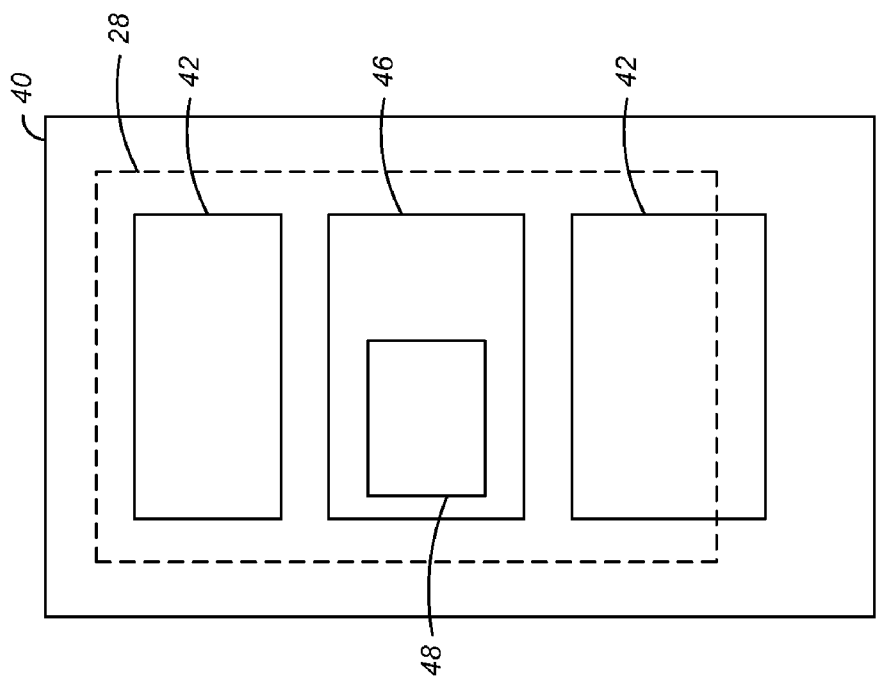

In FIG. 3A, two container elements 42 are positioned at least partially within the viewable area of the rendered content 40, as represented by the content display area 28. The resizable container element 46 and the scalable element 48 are positioned entirely within the viewable area of the rendered content 40. Part of the rendered content 40 is not viewable, because the rendered content 40 is located partially outside of the content display area 28.

In FIG. 3B, as a result of a scaling input from a user, the size of the scalable element 48 and the size of the container element 46 have changed with respect to the rendered content 40, the container elements 42, and the viewable area of the rendered content 40. The size of the scalable element 48 has changed as a function of the scaling input. The size of the resizable container element 46 has changed in correspondence to the size of the scalable element 48, such that sufficient space is provided within the resizable container element 46 for the scalable element 48, such that the scalable element 48 remains located entirely within the resizable container element 46.

This change in size has not been applied to the rendered content 40 as a whole. The size of the container elements 42 has not changed with respect to the viewable area of the rendered content 40. The position of at least one of the container elements 42, however, has changed. The change in size of the resizable container element 46 has triggered the rendering function of the rendering component 22, the positions of the display elements described by the structured document 30 have changed, and as a result, the positions of at least some of the elements of the rendered content 40 have changed.

Figure 3C:
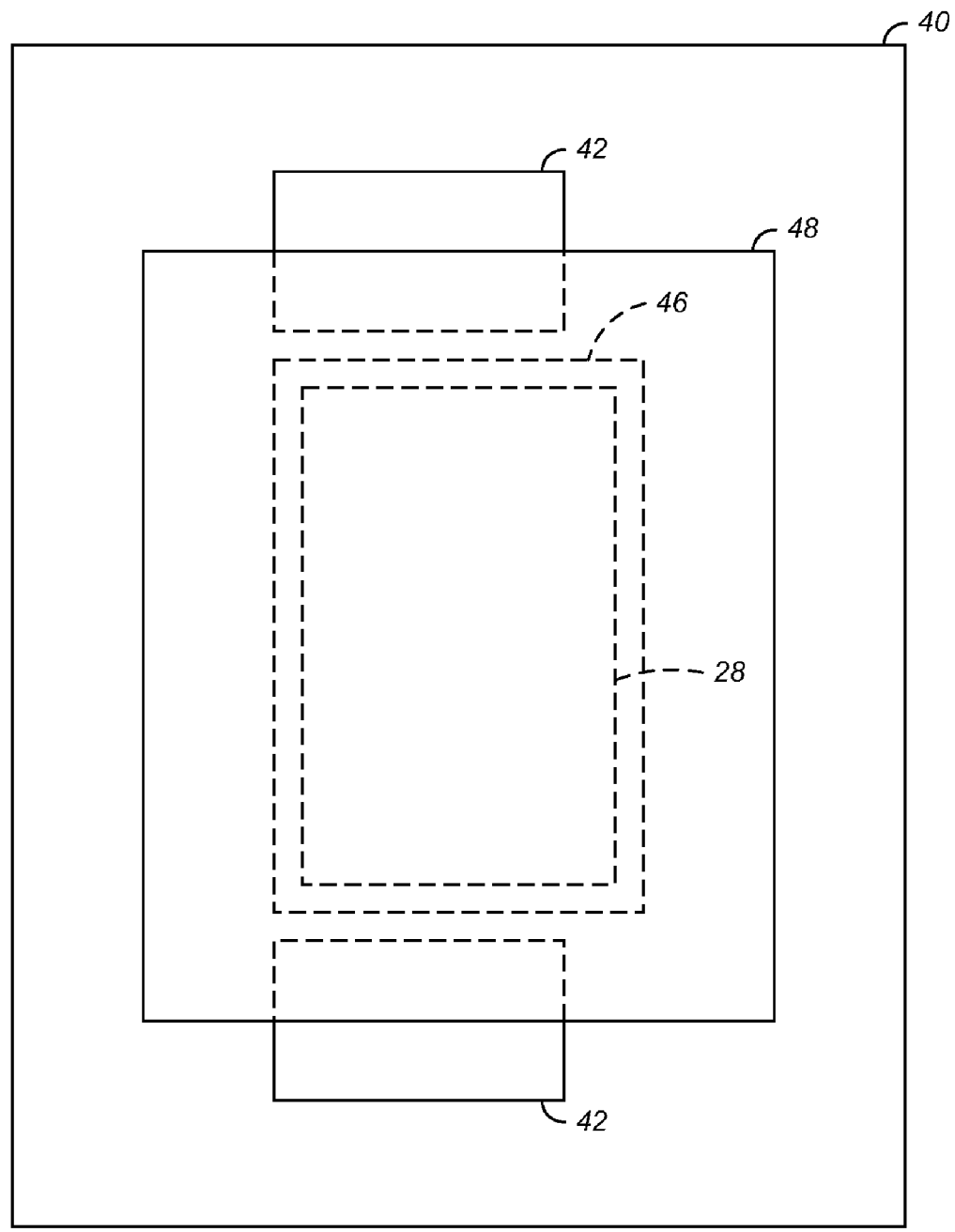

In FIG. 3C, as a result of a scaling input from a user, the size of the scalable element 48 and the size of the resizable container element 46 have changed such that no portions of the resizable container element 46 are viewable, as the resizable container element 46 is now positioned entirely outside of (and in this example surrounding) the boundary of the content display area 28. As one example, this can be the case when the scalable element 48 occupies the entirety of the content display area 28.

The scaling component 32 does not redefine the size of the resizable container element 46 when the resizable container element 46 is not viewable. Rather, in response to a scaling input when the resizable container element 46 is not viewable, the scaling component 32 determines whether the resizable container element 46 would be positioned at least partially within the viewable area of the rendered content if its size were changed. The scaling component 32 selectively redefines the size of the resizable container element 46 based on the display position of the resizable container element 46 with respect to the viewable area of the rendered content 40.

As an example, the scaling component 32 can selectively resize the resizable container element 46 by determining whether the resizable container element 46 will be located within the viewable area of the rendered content 40 if the resizable container element is resized to completely contain the scalable element 48. The scaling component 32 resizes the resizable container element 46 if it will be located at least partially within the viewable area of the rendered content 40, and the scaling component 32 maintains the size of the resizable container element 46 if it will not be located within the viewable area of the rendered content 40. This determination can be made by calculating an updated position and size for the resizable container element 46, and comparing the results of this calculation to the extent of the content display area 28.

If the resizable container element 46 would not be positioned at least partially within the viewable area of the rendered content 40 if its size were changed, the size of the resizable container element 46 is not changed. Because the size of the resizable container element 46 is not changed, the positions of other elements of the rendered content 40 are not changed, and the rendering function is not triggered. Stated another way, the rendering function is triggered if the resizable container element 46 is resized, and the rendering function is not triggered if the resizable container element 46 is not resized.

As long as the resizable container element 46 remains non-viewable, the scalable element 48 is resized without regard to the size of the resizable container element 46, and is allowed to exceed the boundaries of the resizable container element. The scalable element 48 remains, however, located at least partially within the resizable container element 46.

Figure 4:
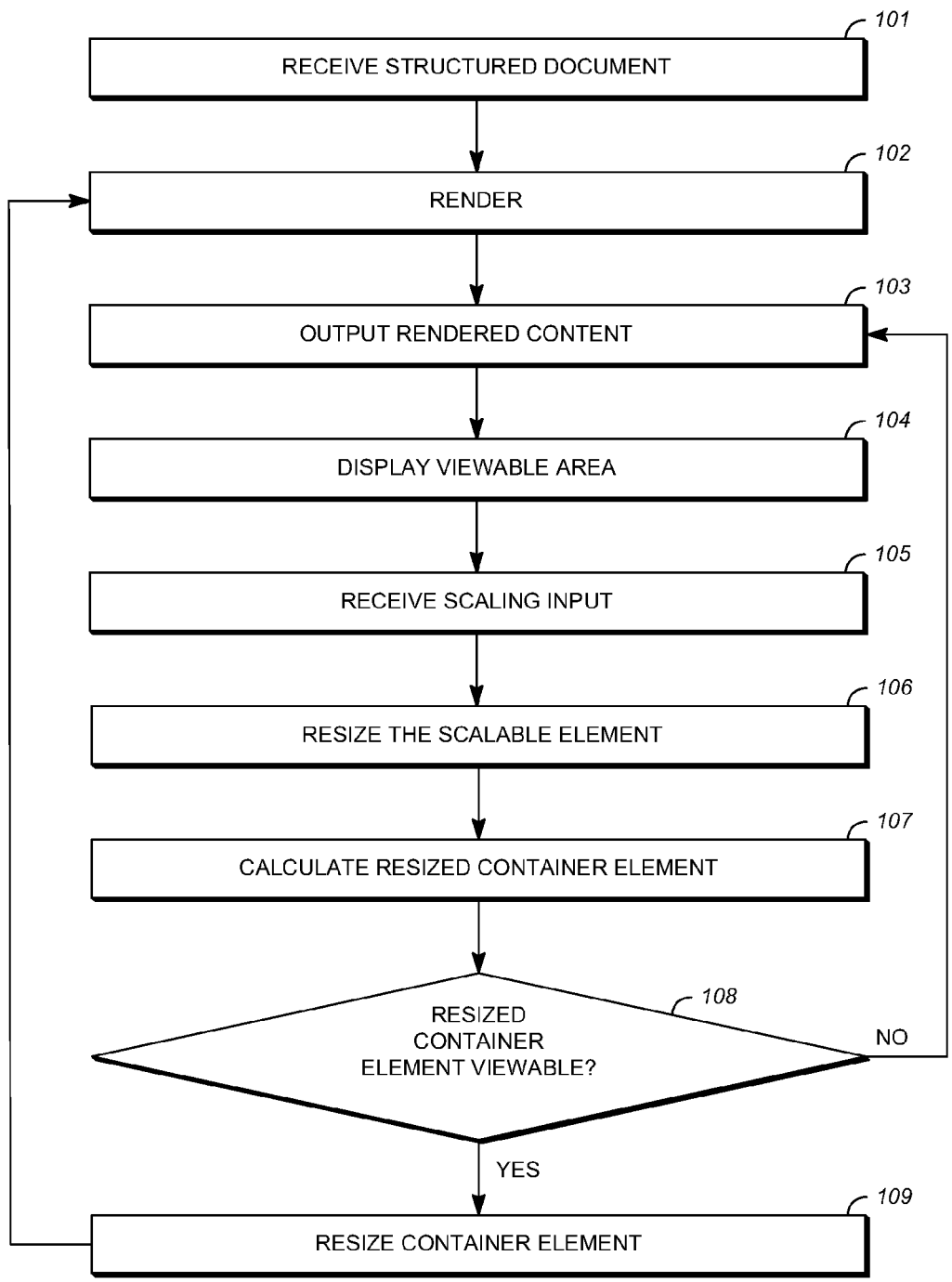
FIG. 4 is a flow chart showing an exemplary process for system for smooth zooming in web applications.
Figure 5:
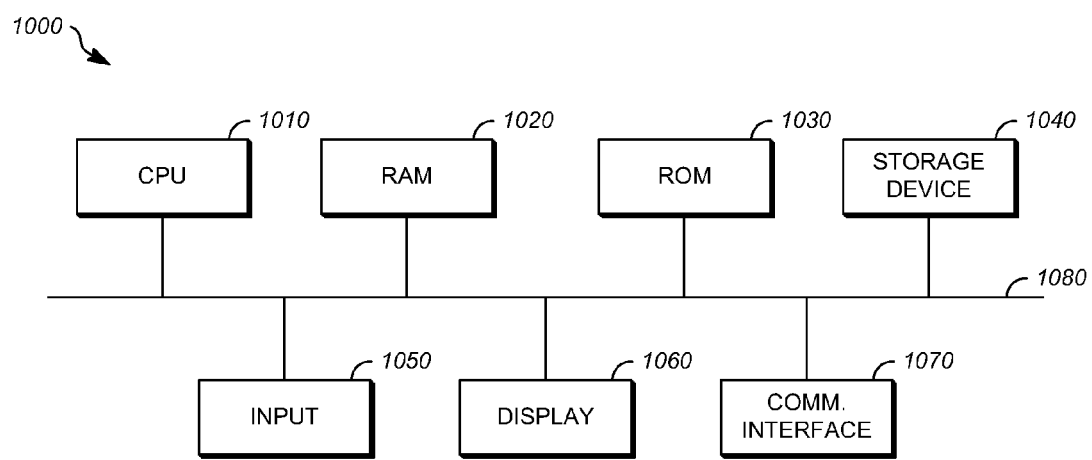
FIG. 5 is a block diagram showing an exemplary computer system.

One example of a process for smooth zooming in applications, as shown in FIG. 4, can be implemented by the client 20 using the structured document 30.

In step 101, the structured document 30 is received by the client 10. In one example, the structured document 30 is received by the client 10 from the web server 12 over the network 18.

In step 102, the rendering component 40 accepts the structured document 30 as an input, and executes the rendering function, which calculates a display position for each of the plurality of display elements that are described by the structured document 30. Using the results of the rendering function, in step 103, the rendering component 22 produces the rendered content 40 as an output.

In step 104 at least a portion of the rendered content 40, i.e. a viewable area of the rendered content 40, is displayed on the display screen 11 in the content area 28.

In step 105, the scaling input is received from the user. The scaling input relates to the scalable element 48, which forms part of the rendered content 40. As one example, in embodiments where the display screen 11 is a touch sensitive display screen, the relative motion of two touch points that are sensed by the display screen 11 can be used as the scaling input. As another example, a command issued by the user from a user interface device, such as a keyboard or mouse, can be used as the scaling input. This can be in the form of a key press or clicking on a menu option, such a menu option that appears in a context sensitive menu that is associated with the scalable element 48.

In step 106, the scalable element 48 is resized by the scaling component 32 using the scaling input. Returning to the example of two touch points as a scaling input, a percentage change in the distance between the two touch points can be applied to the scalable element 48 as a scaling factor, such that the scalable element 48 resizes in proportion to the relative motion of the touch points. Scaling the scalable element 48 does not itself trigger execution of the rendering function of the rendering component 22.

In step 107, the scaling component calculates an updated size attribute for the resizable container element 46. In step 107, the scaling component determines whether the resizable container element 46, if resized according to the updated size attribute, would be viewable, i.e. disposed within the viewable portion of the rendered content 40 as defined by the content area 28. If the scaling component determines that the resizable container element 46, if resized, would not be viewable, the resizable container element 46 is not resized and execution of the rendering function is not performed. Instead the process returns to step 103, where the rendered content is output by the rendering component 22. If the scaling component 22 determines that the resizable container element 46, if resized, would be viewable, the process proceeds to step 109, where the resizable container element 46 is resized by redefining the size of the resizable container element 46 in the structured document 30. This necessitates execution of the rendering function, and the process returns to step 102, where the rendering function is executed, causing the size of the resizable container element to be changed in the rendered content 40.

As used herein, the term "computer" means any device of any kind that is capable of processing a signal or other information. Examples of computers include, without limitation, an application-specific integrated circuit (ASIC) a programmable logic array (PLA), a microcontroller, a digital logic controller, a digital signal processor (DSP), a desktop computer, a laptop computer, a tablet computer, and a mobile device such as a mobile telephone. A computer does not necessarily include memory or a processor. A computer may include software in the form of programmable code, micro code, and or firmware or other hardware embedded logic. A computer may include multiple processors which operate in parallel. The processing performed by a computer may be distributed among multiple separate devices, and the term computer encompasses all such devices when configured to perform in accordance with the disclosed embodiments.

An example of a device that can be used as a basis for implementing the systems and functionality described herein is a conventional computer 1000, as shown in FIG. 3. The conventional computer 1000 can be any suitable conventional computer. As an example, the conventional computer 1000 can include a processor such as a central processing unit (CPU) 1010 and memory such as RAM 1020 and ROM 1030. A storage device 1040 can be provided in the form of any suitable computer readable medium, such as a hard disk drive. One or more input devices 1050, such as a keyboard and mouse, a touch screen interface, etc., allow user input to be provided to the CPU 1010. A display 1060, such as a liquid crystal display (LCD) or a cathode-ray tube (CRT), allows output to be presented to the user. A communications interface 1070 is any manner of wired or wireless means of communication that is operable to send and receive data or other signals using the network 18. The CPU 1010, the RAM 1020, the ROM 1030, the storage device 1040, the input devices 1050, the display 1060 and the communications interface 1070 are all connected to one another by a bus 1080.

The client 10 and the web server 12 can be implemented in the form of a single system or in the form of separate systems. Moreover, each of the client 10 and the web server 12 can be implemented in the form of multiple computers, processors, or other systems working in concert. As an example, the functions of the web server 12 can be distributed among a plurality of conventional computers, such as the computer 1000, each of which are capable of performing some or all of the functions of the web server 12.

In some embodiments, components of the systems described herein can communicate with one another by networks such as the network 18. The communications functions described herein can be accomplished using any kind of wired and/or wireless computing network or communications means capable of transmitting data or signals, such as a wireless and/or wired computing network allowing communication via, for example, an 802.11 ("Wi-Fi") protocol, cellular data protocol (e.g., EDGE, CDMA, TDMA, GSM, LTE)), and the like. Suitable examples include the internet, which is a packet-switched network, a local area network (LAN), wide area network (WAN), virtual private network (VPN), or any other means of transferring data. A single network or multiple networks that are connected to one another can be used. It is specifically contemplated that multiple networks of varying types can be connected together and utilized to facilitate the communications contemplated by the systems and elements described in this disclosure.

While this disclosure includes what is presently considered to be the most practical and preferred embodiment, it is to be understood that the disclosure is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A system for smooth zooming in web applications, comprising:
  one or more computer processors;
  a structured document defining a plurality of display elements, the plurality of display elements including a resizable container element and a scalable element defined to be located at least partially within the resizable container element when rendered;
  a rendering component, executed at the one or more computer processors, the rendering component operable to receive the structured document as an input, execute a rendering function that calculates a display position for each of the plurality of display elements, and define rendered content based at least in part on the display position for each of the plurality of display elements;

a display component, executed at the one or more computer processors, the display component operable to output a viewable area of the rendered content; and a scaling component, executed at the one or more computer processors, the scaling component operable to receive a scaling input, redefine the scalable element based at least in part on the scaling input, determine whether the resizable container element will be located within the viewable area if the size of the resizable container element is changed so that the resizable container element completely contains the scalable element, redefine the size of the resizable container element if it will be located within the viewable area, and maintain the size of the resizable container element if it will not be located within the viewable area.

2. The system of claim 1, wherein the rendering function is triggered if the size of the resizable container element is redefined, and the rendering function is not triggered if the size of the resizable container element is not redefined.

3. The system of claim 1, wherein the size of the scalable element with respect to the rendered content changes when the scaling component redefines the scalable element according to the scaling input.

4. The system of claim 1, wherein the size of the resizable container element with respect to the rendered content changes when the scaling component redefines the resizable container element.

5. A system for smooth zooming in web applications, comprising:

one or more computer processors;

a structured document defining a plurality of display elements, the plurality of display elements including a resizable container element having a container size attribute and a scalable element having a scaling attribute, wherein the scalable element is defined to be located at least partially within the resizable container element when rendered;

a rendering component, executed at the one or more computer processors, the rendering component operable to receive the structured document as an input, execute a rendering function that calculates a display position for each of the plurality of display elements, and define rendered content based at least in part on the display position for each of the plurality of display elements;

a display component, executed at the one or more computer processors, the display component operable to output a viewable area of the rendered content; and a scaling component, executed at the one or more computer processors, the scaling component operable to receive a scaling input requesting scaling of the scalable element, redefine the scaling attribute of the scalable element based at least in part on the scaling input, calculate an updated container size attribute for the resizable container element, determine whether the resizable container element will be located within the viewable area if the container size attribute of the resizable container element is changed to the updated container size attribute so that the resizable container element completely contains the scalable element, set the container size attribute to the updated container size attribute if the resizable container element will be located within the viewable area, and maintain the size of the resizable container element if the resizable container element will not be located within the viewable area.

6. The system of claim 5, wherein redefining the scaling attribute of the scalable element according to the scaling input is operable to change the size of the scalable element with respect to the rendered content.

7. The system of claim 6, wherein modifying the scaling attribute of the scalable element according to the scaling input does not trigger the rendering function of the rendering component.

8. The system of claim 5, wherein setting the container size attribute to the updated container size attribute changes the size of the container with respect to the structured document.

9. The system of claim 8, wherein setting the container size attribute to the updated container size attribute triggers the rendering function of the rendering component.

10. The system of claim 5, wherein the structured document is an HTML document.

11. The system of claim 5, wherein the scaling component is executed based on scaling function code that is included as part of the structured document.

12. The system of claim 5, wherein the scalable element is an image.

13. A method, comprising:

receiving a structured document defining a plurality of display elements, the plurality of display elements including a resizable container element and a scalable element defined to be located at least partially within the resizable container element;

executing a rendering function that calculates a display position for each of the plurality of display elements;

producing rendered content, the rendered content based at least in part on the display position for each of the plurality of display elements;

outputting a viewable area of the rendered content;

receiving a scaling input;

redefining the size of the scalable element according to the scaling input; and selectively redefining the size of the resizable container element based on the display position of the resizable container element with respect to the viewable area of the rendered content by determining whether the resizable container element will be located within the viewable area if resized to completely contain the scalable element, resizing the resizable container element if it will be located within the viewable area, and maintaining the size of the resizable container element if it will not be located within the viewable area.

14. The method of claim 13, wherein the rendering function is triggered if the size of the resizable container element is redefined, and the rendering function is not triggered if the size of the resizable container element is not redefined.

15. The method of claim 13, wherein the size of the scalable element with respect to the rendered content changes when the scaling component redefines the size of the scalable element according to the scaling input.

16. The method of claim 13, wherein the size of the resizable container element with respect to the rendered content changes when the scaling component redefines the size of the resizable container element.

17. The method of claim 13, wherein redefining the size of the scalable element according to the scaling input is operable to change the size of the scalable element with respect to the rendered content.

18. The method of claim 17, wherein redefining the size of the scalable element according to the scaling input does not trigger the rendering function.

19. The method of claim 13, wherein resizing the resizable container element changes the size of the resizable container element with respect to the structured document.

20. The method of claim 19, wherein resizing the resizable container element triggers the rendering function.

21. The method of claim 13, wherein the structured document is an HTML document.

22. The method of claim 13, wherein redefining the size of the scalable element according to the scaling input includes executing scaling function code that is included as part of the structured document.

23. The method of claim 13, wherein the scalable element is an image.

24. The method of claim 13, wherein the plurality of display elements includes at least one additional display element, the size of which is unchanged by redefining the size of the scalable element according to the scaling input.

25. The method of claim 13, wherein the plurality of display elements includes at least one additional display element, the position of which is changed by redefining the size of the scalable element according to the scaling input.

26. The method of claim 13, wherein determining whether the resizable container element will be located within the viewable area if resized to completely contain the scalable element includes calculating an updated position and size for the resizable container element and comparing the updated position and size for the resizable content element to the extent of the viewable area of the rendered content.

27. The method of claim 13, wherein the scaling input includes a percentage change in the distance between two touch points that are sensed by a display screen.

28. The method of claim 13, wherein the resizable container element corresponds to an electronic message.

29. The method of claim 13, wherein the plurality of display elements of the structured document defines at least a portion of an interface for an electronic mail program.

30. The method of claim 13, wherein redefining the size of the scalable element according to the scaling input includes applying at least one of an HTML modification or a CSS modification to the scalable element.

* * * * *